US008857084B2

(12) United States Patent
Courter

(10) Patent No.: US 8,857,084 B2
(45) Date of Patent: Oct. 14, 2014

(54) MOBILE ADVERTISING DISPLAYS

(71) Applicant: Gary Courter, Portland, OR (US)

(72) Inventor: Gary Courter, Portland, OR (US)

(*) Notice: Subject to any disclaimer, the term of this patent is extended or adjusted under 35 U.S.C. 154(b) by 0 days.

(21) Appl. No.: 13/898,157

(22) Filed: May 20, 2013

(65) Prior Publication Data

US 2013/0333257 A1     Dec. 19, 2013

(51) Int. Cl.
*G09F 15/00* (2006.01)
*G09F 21/04* (2006.01)
(52) U.S. Cl.
CPC ............ *G09F 21/048* (2013.01); *G09F 21/045* (2013.01)
USPC ........................ 40/607.12; 40/590; 280/288.4
(58) Field of Classification Search
CPC .......... G09F 15/0056; G09F 7/18; G09F 7/20
USPC ...................... 40/607.12; 280/288.4
See application file for complete search history.

(56) References Cited

U.S. PATENT DOCUMENTS

| | | | |
|---|---|---|---|
| 1,359,492 A | 11/1920 | Demuth | |
| 2,147,890 A | 2/1939 | Glasgow | |
| 2,675,983 A | 4/1954 | King | |
| 3,088,235 A | 5/1963 | Kies | |
| 3,986,722 A | 10/1976 | Patterson | |
| 3,997,184 A * | 12/1976 | Riti | 280/288.4 |
| 4,096,551 A | 6/1978 | Prester | |
| 4,478,381 A | 10/1984 | Pittion et al. | |
| 4,776,116 A | 10/1988 | Shuman | |
| 4,780,864 A | 10/1988 | Houlihan | |
| 4,819,217 A | 4/1989 | Houlihan | |
| 4,969,693 A | 11/1990 | Molson | |
| 5,002,520 A | 3/1991 | Greenlaw | |
| 5,120,073 A | 6/1992 | Sealy, Jr. | |
| 5,177,432 A | 1/1993 | Waterhouse et al. | |
| 5,197,214 A * | 3/1993 | Bseilis | 40/617 |
| 5,234,233 A | 8/1993 | Fix | |
| 5,247,852 A | 9/1993 | Guerr | |
| 5,257,768 A | 11/1993 | Juenemann et al. | |
| 5,339,551 A | 8/1994 | Elmer | |
| 5,369,900 A * | 12/1994 | Garrison | 40/631 |
| 5,428,913 A * | 7/1995 | Hillstrom | 40/604 |
| 5,433,026 A | 7/1995 | McDermott et al. | |
| 5,469,637 A | 11/1995 | Adam | |
| 5,497,973 A * | 3/1996 | Balzen et al. | 248/551 |
| D374,848 S * | 10/1996 | Liles et al. | D12/114 |
| 5,575,443 A | 11/1996 | Honeycutt | |
| 5,584,521 A | 12/1996 | Hathaway et al. | |
| 5,644,511 A | 7/1997 | McWhorter | |
| 5,664,749 A | 9/1997 | Kump et al. | |
| 5,716,070 A | 2/1998 | Pearson | |
| 5,743,418 A | 4/1998 | Ahrens | |
| 5,857,659 A * | 1/1999 | Kato et al. | 248/634 |
| 5,913,432 A | 6/1999 | Ahrens | |
| D414,213 S * | 9/1999 | Yates | D20/42 |

(Continued)

*Primary Examiner* — Charles A Fox
*Assistant Examiner* — Shin Kim
(74) *Attorney, Agent, or Firm* — Mohr Intellectual Property Law Solutions, PC

(57) ABSTRACT

Mobile advertising displays configured to mount to a bicycle having a frame and a wheel, the mobile advertising displays including a mounting mechanism configured to mount to the frame of the bicycle proximate the wheel, a brace coupled to the mounting mechanism, and a display retained on the brace. In some examples, the mobile advertising display is bilaterally mounted to the frame of the bicycle and includes identifying information. In some further examples, the mobile advertising display includes a stabilizer.

20 Claims, 11 Drawing Sheets

(56) References Cited

U.S. PATENT DOCUMENTS

| | | | |
|---|---|---|---|
| 6,023,867 A * | 2/2000 | Gagne | 40/491 |
| 6,069,788 A | 5/2000 | Masui | |
| 6,250,002 B1 | 6/2001 | Wittenberg | |
| 6,305,111 B1 | 10/2001 | Opdahl | |
| 6,367,832 B1 | 4/2002 | Vogel | |
| 6,493,973 B1 * | 12/2002 | Nelson | 40/607.12 |
| 6,550,170 B1 * | 4/2003 | Cooper et al. | 40/607.12 |
| 6,598,327 B1 | 7/2003 | Strzeletz | |
| 6,618,973 B2 * | 9/2003 | Nelson | 40/604 |
| 6,782,646 B1 | 8/2004 | Devaney | |
| 6,796,063 B1 | 9/2004 | Bryant | |
| 6,839,996 B2 * | 1/2005 | Kim | 40/607.14 |
| 6,935,268 B1 | 8/2005 | Hawkins | |
| 6,976,660 B2 * | 12/2005 | Lapointe et al. | 248/218.4 |
| 7,004,480 B2 | 2/2006 | Trubiano | |
| 7,025,344 B2 * | 4/2006 | Kammel et al. | 267/189 |
| 7,093,724 B1 | 8/2006 | Kessler | |
| 7,124,525 B2 | 10/2006 | Green, III et al. | |
| 7,213,356 B2 | 5/2007 | Haggard, Jr. | |
| 7,237,754 B2 * | 7/2007 | Sparkowski | 248/219.1 |
| 7,287,349 B1 | 10/2007 | MacDonald et al. | |
| 7,302,768 B2 | 12/2007 | Gajdacs | |
| 7,343,705 B2 | 3/2008 | Kruse | |
| 7,347,018 B2 | 3/2008 | Haggard, Jr. | |
| 7,406,788 B2 | 8/2008 | Uccello, III et al. | |
| 7,503,135 B2 | 3/2009 | Chafin | |
| 7,559,163 B2 | 7/2009 | Ofuji et al. | |
| 7,571,560 B2 | 8/2009 | Peterman | |
| 7,617,626 B2 | 11/2009 | Balscheit | |
| 7,637,339 B2 | 12/2009 | Suzuki | |
| 7,677,592 B2 | 3/2010 | Giesler | |
| 7,694,988 B2 * | 4/2010 | Sturtevant | 280/288.4 |
| 7,698,843 B2 * | 4/2010 | Hillstrom et al. | 40/604 |
| 7,789,351 B2 | 9/2010 | Auer | |
| 8,037,629 B2 | 10/2011 | Harris | |
| 8,047,476 B2 | 11/2011 | Van Walraven | |
| 8,074,388 B2 | 12/2011 | Trainer | |
| 8,083,247 B2 | 12/2011 | Lee | |
| 8,091,911 B2 | 1/2012 | Lin | |
| 8,117,775 B2 | 2/2012 | Hedditch | |
| 8,132,764 B2 | 3/2012 | Kuipers | |
| 8,146,279 B2 | 4/2012 | Elmer | |
| 8,181,372 B2 | 5/2012 | Osiecki et al. | |
| 8,191,294 B2 * | 6/2012 | Lennard | 40/607.13 |
| 8,215,593 B2 | 7/2012 | Van Walraven | |
| 8,234,805 B2 | 8/2012 | Dukes et al. | |
| 8,246,224 B2 | 8/2012 | Sherwin | |
| 8,272,310 B2 | 9/2012 | Ingram | |
| 8,272,659 B2 | 9/2012 | Merdith | |
| 8,282,048 B2 | 10/2012 | Nguyen et al. | |
| 8,296,979 B2 | 10/2012 | Pereira et al. | |
| 8,305,742 B2 | 11/2012 | Onnela et al. | |
| 8,322,782 B2 | 12/2012 | Shallcross et al. | |
| 8,336,834 B2 | 12/2012 | Matsumoto et al. | |
| 8,341,878 B2 | 1/2013 | Decker | |
| 8,342,460 B2 | 1/2013 | Binkert et al. | |
| 8,348,296 B2 | 1/2013 | Taiga | |
| 8,376,383 B1 | 2/2013 | Lee | |
| 8,381,361 B2 | 2/2013 | Serna-Gongora et al. | |
| 8,382,341 B2 | 2/2013 | Peter | |
| 8,393,506 B2 | 3/2013 | Malm | |
| 8,393,794 B1 | 3/2013 | Shiraishi | |
| 8,403,391 B2 | 3/2013 | Steinhilb et al. | |
| 8,413,934 B2 | 4/2013 | Hara | |
| 8,627,587 B2 * | 1/2014 | O'Dell | 40/607.12 |
| 2006/0005440 A1 * | 1/2006 | Young et al. | 40/590 |
| 2009/0031600 A1 * | 2/2009 | Anderson et al. | 40/606.03 |
| 2011/0271571 A1 * | 11/2011 | Lennard | 40/606.01 |

\* cited by examiner

MOBILE ADVERTISING DISPLAYS

BACKGROUND

The present disclosure relates generally to mobile advertising displays. In particular, mobile advertising displays configured to mount to a bicycle are described.

Known mobile advertising displays are not entirely satisfactory for the range of applications in which they are employed. For example, existing mobile advertising displays are unnecessarily large and may be designed to mount to a motor vehicle. Existing mobile advertising displays are often configured to mount to a large surface area, for example, the side of a delivery truck. However, delivery trucks and even smaller motor vehicles are restricted to limited areas, such as highways, streets, and parking garages.

In addition, conventional mobile advertising displays configured to mount to a bicycle require a separate trailer to be hitched to, and towed behind, the bicycle. Existing advertising displays configured to mount to a bicycle are bulky and inconvenient; existing displays create an un-aerodynamic profile.

The dimension and weight of conventional advertising displays further limit areas that a bicycle can access. The riders of bikes bearing advertising displays are forced to alter riding habits and routes to accommodate the inconvenient bulky trailer. Inconvenient conventional displays can lead to increased commute time, rider fatigue, and an increased likelihood of accidents due to the added weight and girth of the advertising display.

Further, existing mobile advertising displays only reach a limited audience. Existing displays may only be displayed in the limited areas that can be accessed by large motor vehicles, or bulky, inconvenient towed trailers. Pedestrian and bike traffic largely ignores motor vehicle advertising. Additionally, even when a bulky bike trailer is used, the intended audience is distracted by the cumbersome trailer and the intended message of the advertising is lost. Indeed, bike trailers are often a source of consternation, and members of the advertising displays' target audience may be less likely to consume a product or service displayed on the advertising displays after a particularly frustrating encounter with conventional advertising displays.

Moreover, existing advertising displays lack identifying indicia for advertising displayed on a specific route or bike. Potential advertisers who may desire to reach a particular audience or targeted set of commuters have limited methods of determining the particular bicycle on which they desire to display advertising. Conventional advertising displays lack an efficient identifying system, and valuable logistical information cannot be compiled and extrapolated easily.

Existing advertising displays additionally lack identifying indicia for a particular side of a vehicle that may be particularly desirable to an advertiser. Conventional mobile advertising displays typically inefficiently advertise an identical message on each advertising surface. Lack of identifying indicia specific to each advertising surface on conventional advertising displays further limits the effectiveness of existing advertising displays.

Thus, there exists a need for mobile advertising displays that improve upon and advance the design of known mobile advertising displays. Examples of new and useful mobile advertising displays relevant to the needs existing in the field are discussed below.

SUMMARY

The present disclosure is directed to mobile advertising displays configured to mount to a bicycle having a frame and a wheel, the mobile advertising displays including a mounting mechanism configured to mount to the frame of the bicycle proximate the wheel, a brace coupled to the mounting mechanism, and a display retained on the brace. In some examples, the mobile advertising display is bilaterally mounted to the frame of the bicycle and includes identifying information. In some further examples, the mobile advertising display includes a stabilizer.

DETAILED DESCRIPTION

Figure 1:
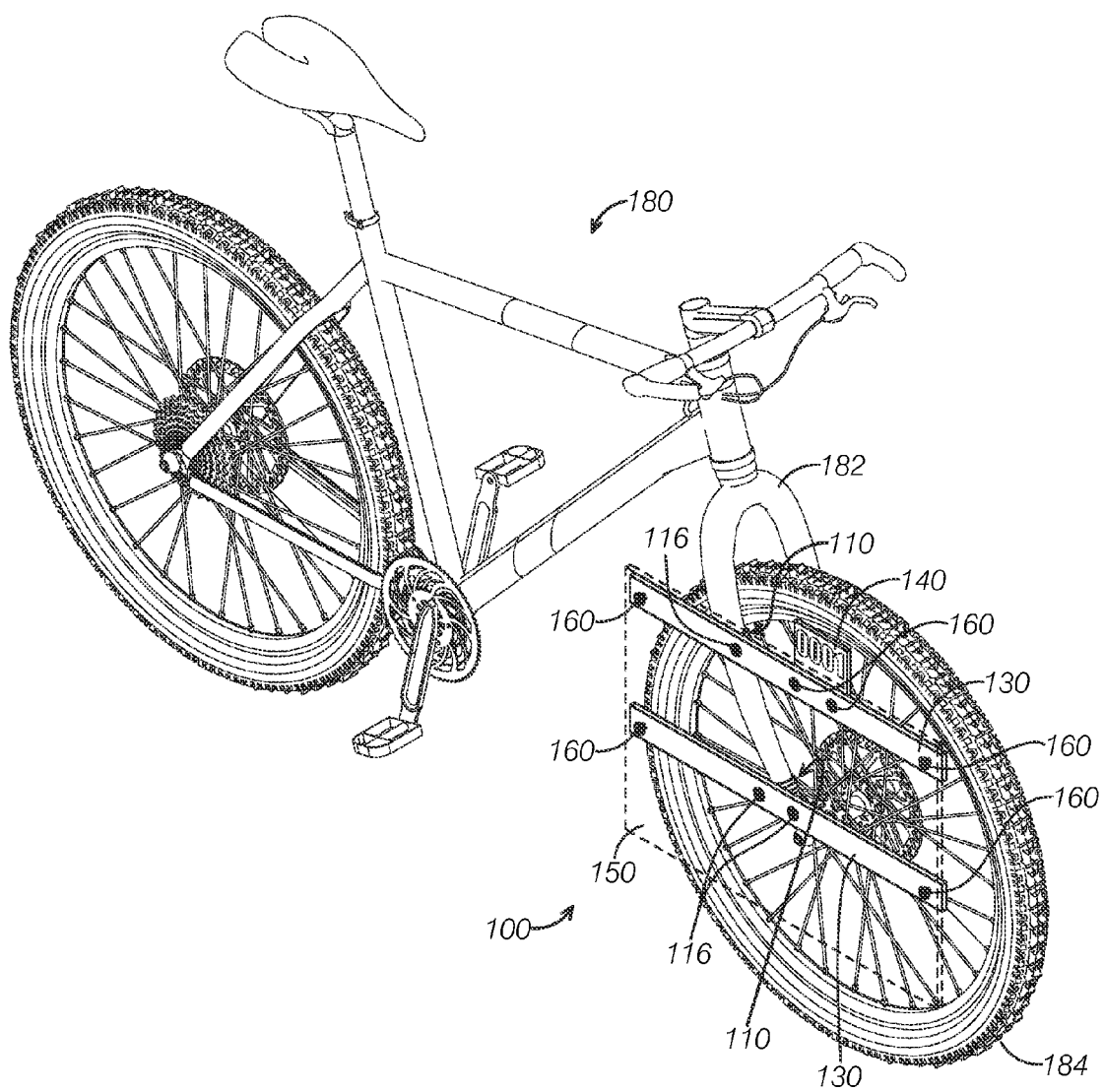
FIG. 1 is a side perspective view of a first example of a mobile advertising display configured to mount to a bicycle.

The disclosed mobile advertising displays configured to mount to a bicycle will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various mobile advertising displays configured to mount to a bicycle are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

With reference to FIGS. 1-5, a first example of a mobile advertising display configured to mount to a bicycle, mobile advertising display 100, will now be described. Mobile advertising display 100 includes a mounting mechanism 110, a brace 130, and a display 150. Mobile advertising display 100 is configured to mount to a bicycle 180, which includes a frame 182 and a wheel 184. Mobile advertising display 100 is depicted as unilaterally mounted to frame 182, however, it is additionally contemplated that the mobile advertising display may be bilaterally mounted to frame 182 to display advertising on both sides of wheel 184 as discussed in further examples below.

Figure 3:
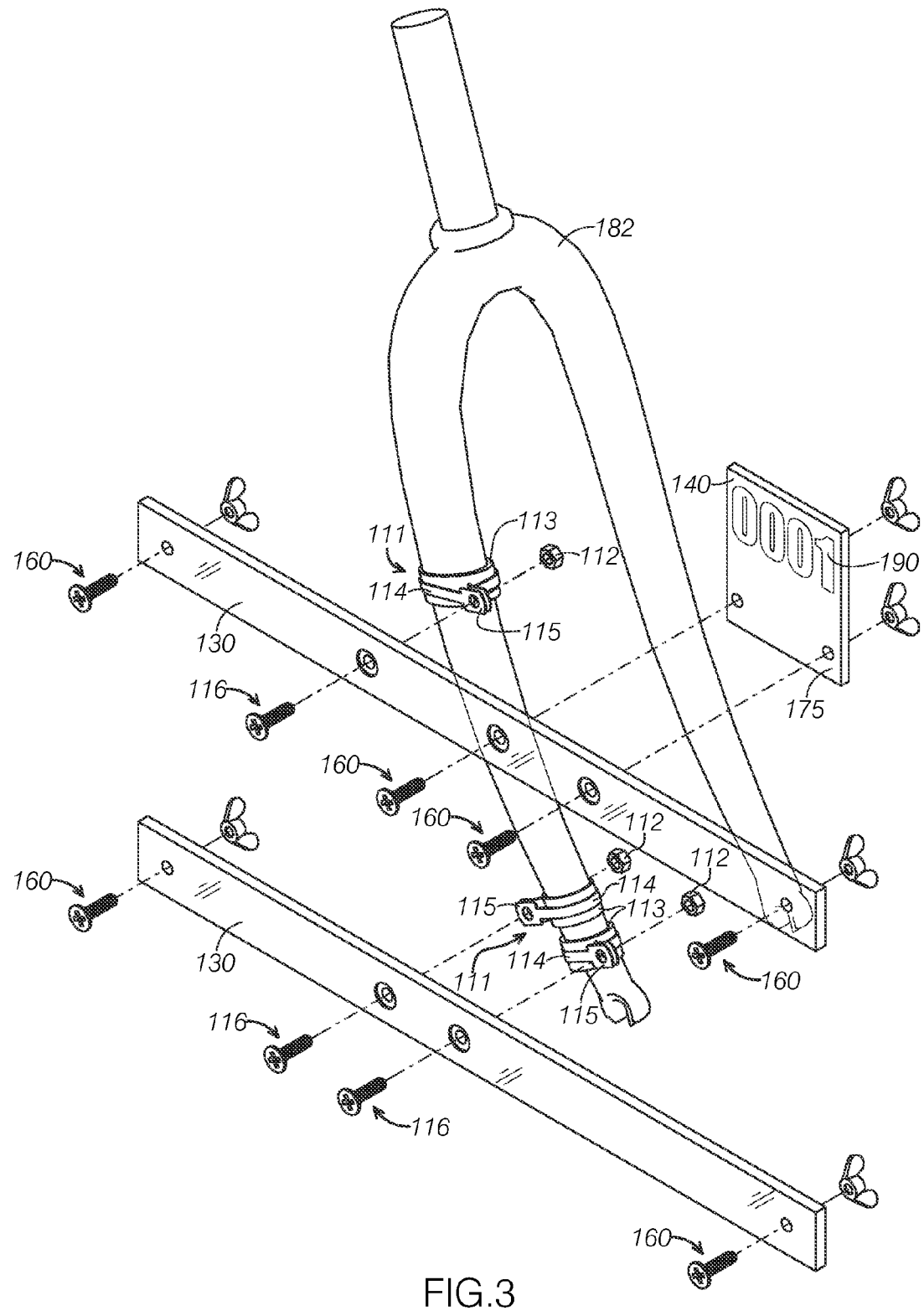
FIG. 3 is an exploded view of the mobile advertising display shown in FIG. 1.

As shown most clearly in FIG. 3, mounting mechanism 110 includes a retaining member 111, a coupling member 112, and a protecting member 113. Mounting mechanism 110 serves to couple mobile advertising display 100 to bike 180.

Figure 4:
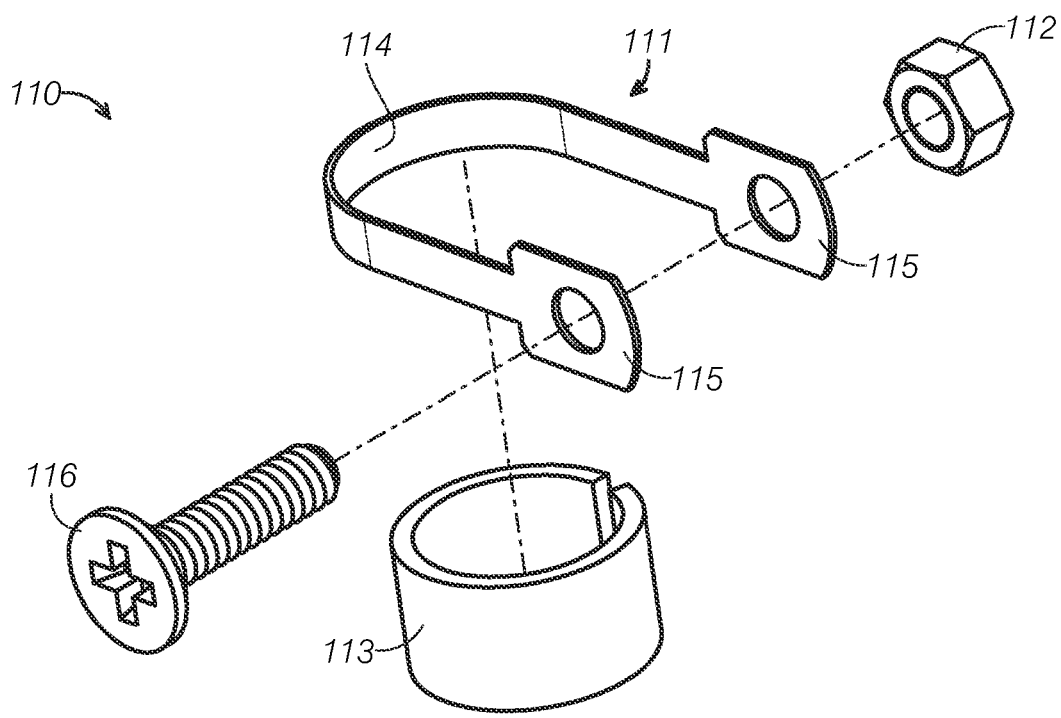
FIG. 4 is an exploded view of a first example of a mounting mechanism of the mobile advertising display shown in FIG. 1.
Figure 5:
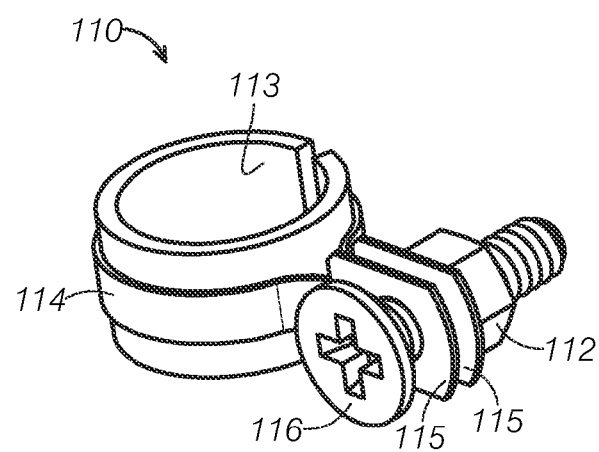
FIG. 5 is a close-up view of the first example of a mounting mechanism of the mobile advertising display shown in FIG. 1.

As shown most clearly in FIGS. 3-5, retaining member 111 is configured to retain mounting mechanism 110 proximate frame 182. Retaining member 111 includes a u-shaped bracket 114 and a planar tab 115 coupled to u-shaped bracket 114. Planar tab 115 is configured to receive a threaded shaft coupling member 116. Threaded shaft coupling member 116 is complimentarily configured with coupling member 112 and configured to selectively couple mounting mechanism 110 to brace 130.

Figure 2:
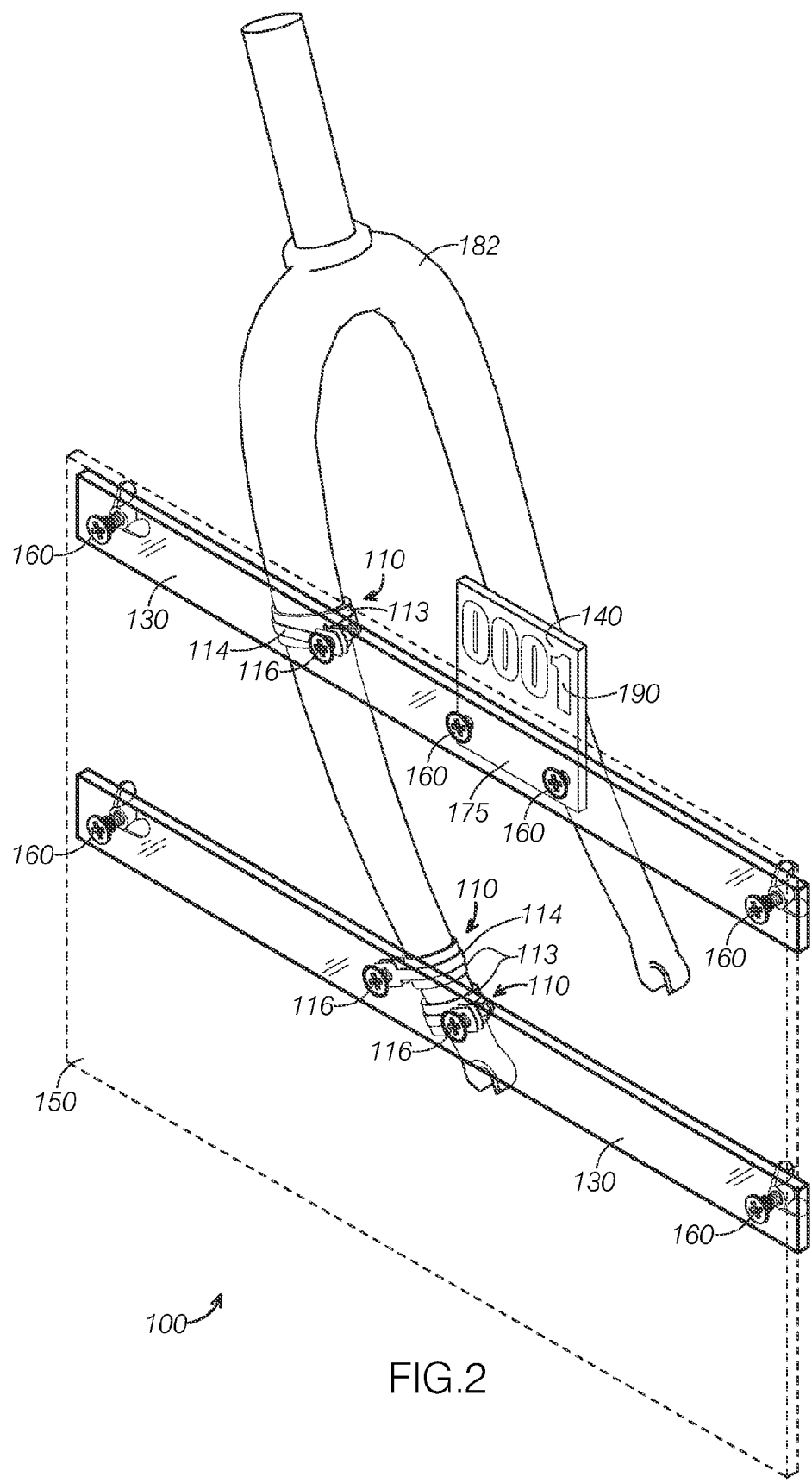
FIG. 2 is a perspective view of the mobile advertising display shown in FIG. 1, depicting the mobile advertising display mounted on the bicycle frame without a wheel.

Coupling member 112 is configured to selectively couple mounting mechanism 110 to brace 130. In one example, as shown in FIG. 2, coupling member 112 is configured as a threaded bore. Acceptable coupling members may also include, but are not limited to, wing nuts, lock nuts, clips, clamps, and pins. Further, coupling members may be comprised of any suitable material including, but not limited to, wood, plastic, metal, carbon fiber, composites, and combinations thereof.

As shown most clearly in FIG. 2, protecting member 113 is disposed proximate frame 182 between mounting mechanism 110 and frame 182. Protecting member 113 is complimentarily configured with frame 182 to receive frame 182. Additionally, protecting member 113 is configured to restrict or prevent retaining member 111 from damaging frame 182.

In one example, protecting member 113 is comprised of rubber and configured in a sleeve configuration. Additional protecting members may be comprised of any suitable material capable of preventing damage to a bike frame including, but not limited to wood, plastic, metal, carbon fiber, composites, and combinations thereof. Further, protecting members may be configured in any suitable configuration capable of preventing damage to a bike frame including, but not limited to, wraps, sheets, and pressure-relieving disks.

In the example depicted in FIG. 2, protecting member 113 is independent of, and wholly separated from, retaining member 111. Alternatively, protecting members may also be fixedly integrated with or removably integrated with retaining members. Additionally or alternatively, protecting members may be fixedly integrated with or removably integrated with bike frames.

As shown in FIG. 3, a single mounting mechanism 110 may selectively couple to brace 130, or multiple mounting mechanisms 110 may selectively couple to the same brace 130. In one example multiple mounting mechanisms retain multiple braces vertically spaced from each other. Mounting mechanisms may also retain braces at lesser or greater vertical spaces according to bracing needs.

In one example, brace 130 is comprised of polycarbonate material. Polycarbonate is particularly effective as a brace material because it is readily deformable and resilient. Additionally or alternatively, braces may be comprised of any readily deformable and resilient material including, but not limited to, wood, plastic, plexiglass, fiberglass, metal, carbon fiber, composites, and combinations thereof.

As depicted in FIG. 2, display 150 is selectively coupled to braces 130 by retaining members 160. In one example, retaining members 160 are comprised of a threaded shaft and wing nut. Additionally or alternatively, retaining members may include, but are not limited to, threaded shaft and lock nut, clips, clamps, and pins. Retaining members may additionally include safety elements to enhance visibility of mobile advertising displays, including, but not limited to, reflectors, reflective tape, and flashing illuminated elements.

Also shown in FIG. 2, display 150 is selectively coupled to braces 130. Displays may also be fixedly secured to braces. Displays may be fixedly secured to braces by any now known or later developed securing means including, but not limited to, taping, gluing, fusing, welding, casting, and molding. Additionally or alternatively, displays may be selectively coupled to braces to allow the displays to rotate or self-level as the angle of the braces changes relative to the ground.

In the example shown in FIG. 1, display 150 is comprised of corrugated plastic. Additionally or alternatively, displays may be comprised of any readily deformable resilient material including, but not limited to, wood, plastic, plexiglass, fiberglass, metal, carbon fiber, composites, and combinations thereof. Displays may additionally include safety elements to enhance visibility of mobile advertising displays, including, but not limited to, reflectors, reflective tape, and flashing illuminated elements.

Additionally, display 150 is substantially rectangular in shape and displays advertising media. Advertising media includes any displayable message intended to be interpreted by an audience observing display 150. Moreover, advertising media may include audio messages and audio-visual messages depicted by visual, audio, physical or electronic means. Displays may be comprised of any shape or form that facilitates or allows freely pedaling and maneuvering a bicycle, including, but not limited to, circles, squares, triangles, and trapezoids.

As depicted in FIG. 2, mobile advertising display 100 further includes identifier 140 selectively mounted to brace 130. Identifier 140 includes identifying information 190, and identifier 140 is selectively mounted to brace 130 using retaining members 160. Moreover, identifier 140 includes backing plate 175, which bolsters or improves the robustness of identifier 140. In one example, backing plate 175 is comprised of 0.875 inch×6.5 inch, 16-gauge steel. However, components of any suitable dimensions may be used. In further examples backing plates may be comprise of any rigid material including, but not limited to, wood, plastic, plexiglass, fiberglass, metal, carbon fiber, composites, and combinations thereof.

Turning attention to FIGS. 6-11, a second example of a mobile advertising display, mobile advertising display 200, will now be described. Mobile advertising display 200 includes many similar or identical features to mobile advertising display 100. Thus, for the sake of brevity, each feature of mobile advertising display 200 will not be redundantly explained. Rather, key distinctions between mobile advertising display 200 and mobile advertising display 100 will be described in detail and the reader should reference the discussion above for features substantially similar between the two mobile advertising displays.

Figure 6:
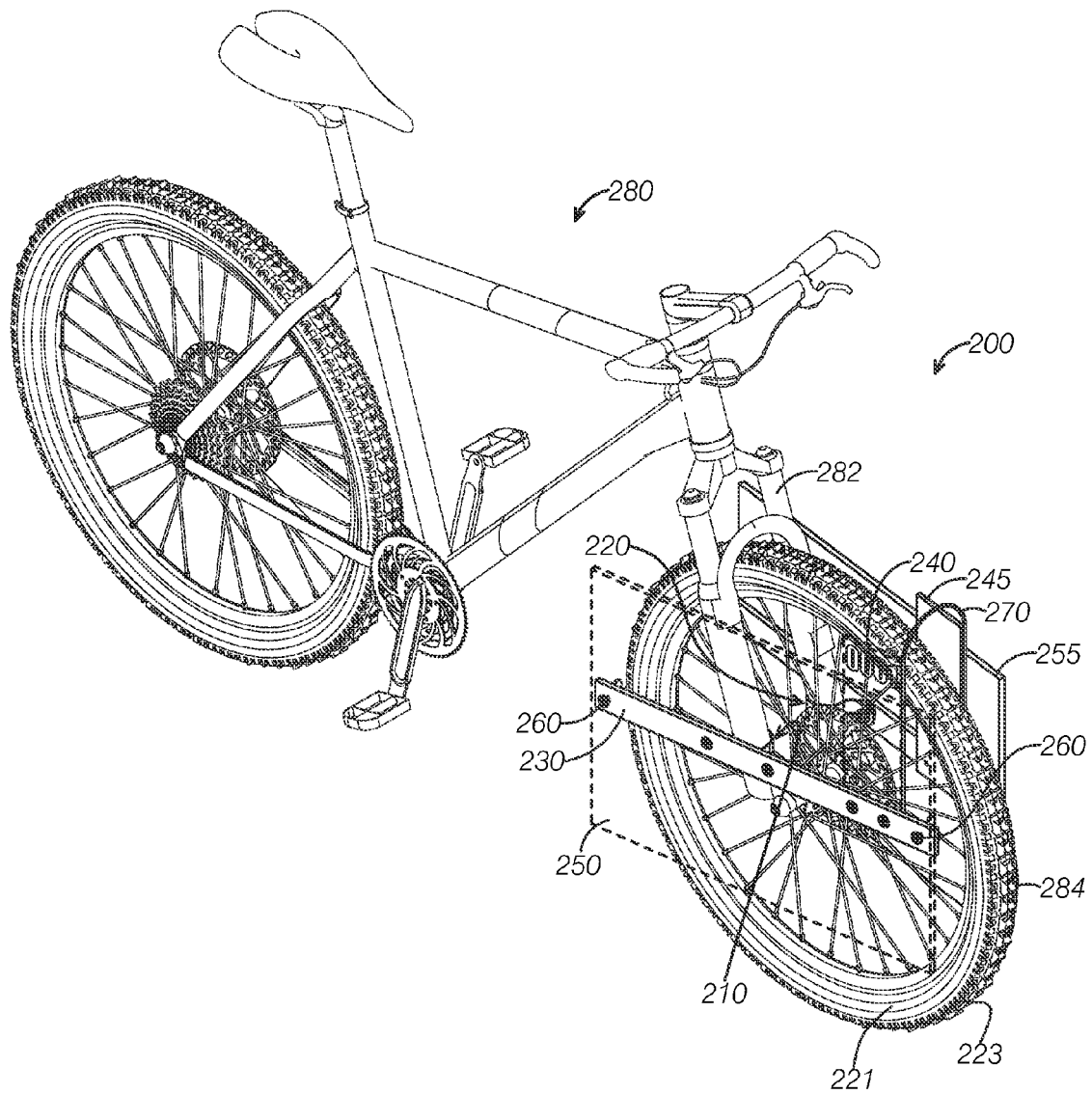
FIG. 6 is a side perspective view of a second example of a mobile advertising display configured to mount to a bicycle including bilaterally mounted advertising displays.

As can be seen in FIG. 6, mobile advertising display 200 includes a first mounting mechanism 210 configured to mount to a frame 282 of a bicycle 280 proximate a first side 221 of a wheel 284. Mobile advertising display 200 further includes a second mounting mechanism 220 configured to mount to frame 282 of bicycle 280 proximate a second side 223 of wheel 284 opposite first side 221. Additionally, mobile advertising display 200 includes first brace 230 selectively coupled to first mounting mechanism 210, and first display 250 selectively retained on first brace 230.

Mobile advertising display 200 additionally includes a second brace 235 selectively coupled to a second mounting mechanism 220, and a second display 255 selectively retained on second brace 235. Although mobile advertising display 200 is depicted as bilaterally mounted to frame 282, mobile advertising display 200 may also be unilaterally mounted to frame 282 to display advertising on one side of wheel 284 of bicycle 280.

Figure 7:
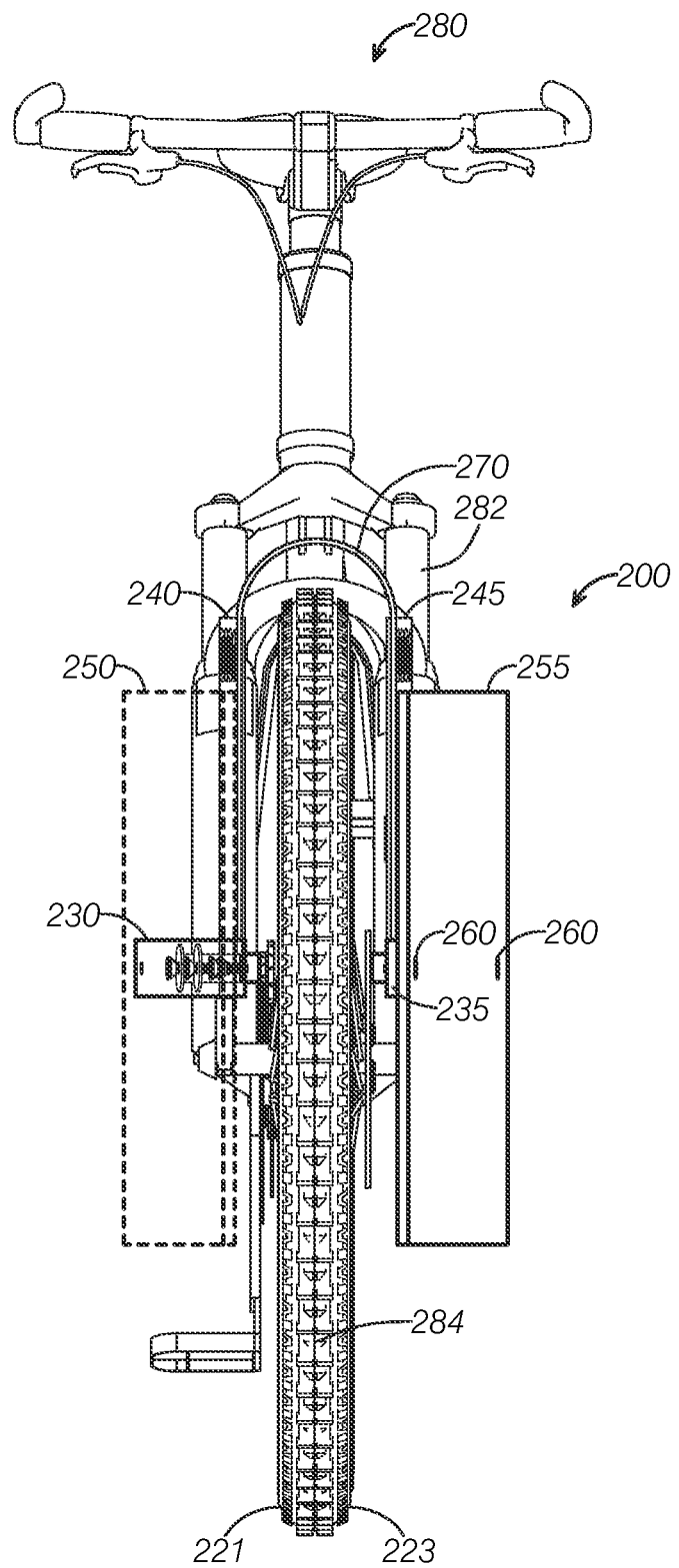
FIG. 7 is a front perspective view of the mobile advertising display shown in FIG. 6, depicting the angle that the advertising displays are supported relative to the bicycle wheel.

As shown most clearly in FIG. 7, displays 250 and 255 are substantially rectangular in shape and configured to display advertising media. Advertising media includes any displayable message intended to be interpreted by an audience observing displays 250 and 255. Display 250 may display advertising media identical to or different from advertising media displayed on display 255. For example, display 250 may display advertising media targeting pedestrian traffic observing side 221 of wheel 284, while display 255 may display advertising media targeting motor vehicle traffic observing side 223 of wheel 284.

Mobile advertising display 200 additionally features a first identifier 240 selectively mounted to first brace 230, a second identifier 245 selectively mounted to second brace 235, and a stabilizer 270. Stabilizer 270 is selectively mounted to first identifier 240 and second identifier 245, and is configured to stabilize first brace 230 relative to second brace 235. Stabilizer 270 is configured to space first identifier 240 and second identifier 245 from wheel 284 to enable wheel 284 to travel freely between first identifier 240 and second identifier 245.

In one example, as shown in FIG. 6, stabilizer 270 is comprised of 3/16-inch steel and is configured in a u-shape. Stabilizers may also be comprised of any suitable material including, but not limited to, wood, plastic, metal, carbon fiber, composites, and combinations thereof. Moreover, stabilizers may also be configured in any shape or configuration that spaces the identifiers relative to each other, stabilizes the braces, and allows the wheel to travel freely. Suitable configurations include, but are not limited to, linear, curved, triangular, and angled.

Figure 8:
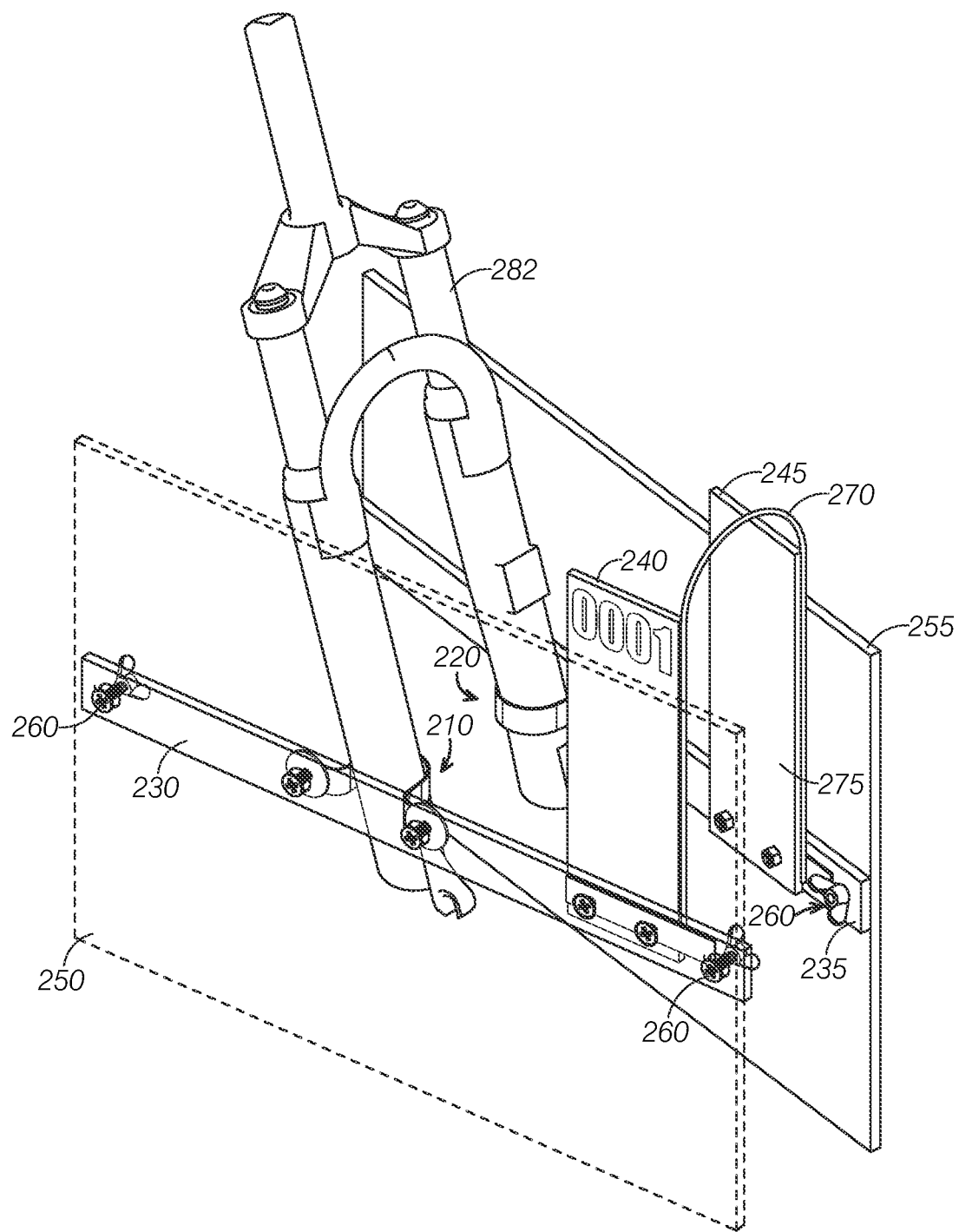
FIG. 8 is a perspective view of the mobile advertising display shown in FIG. 6, depicting the mobile advertising display mounted on the bicycle frame without a wheel.

As shown in FIG. 8, first identifier 240 is selectively mounted to first brace 230 with retaining members 260. Further, second identifier 245 is selectively mounted to second brace 230 with retaining members 260. First identifier 240 and second identifier 245 include backing plates 275 configured to bolster or improve the robustness of first identifier 240 and second identifier 245. In one example, retaining members 260 are comprised of a threaded shaft and wing nut. Retaining members may also include, but are not limited to, threaded shafts and lock nuts, clips, clamps, and pins.

First identifier 240 and second identifier 245 are configured to display identifying information 290. Identifying information 290 facilitates or allows a particular mobile advertising display 200 to be identified. In the example shown in FIG. 6, identifying information 290 is numerical and identical on both first identifier 240 and second identifier 245. Identifying information may also be different on the first identifier compared to the second identifier. Additionally, identifying information may be comprised of any identifying information that facilitates or allows identifying a particular mobile advertising display. Identifying information may be particular to a single bike, or additionally or alternatively, particular to one side of a mobile advertising display.

Figure 9:
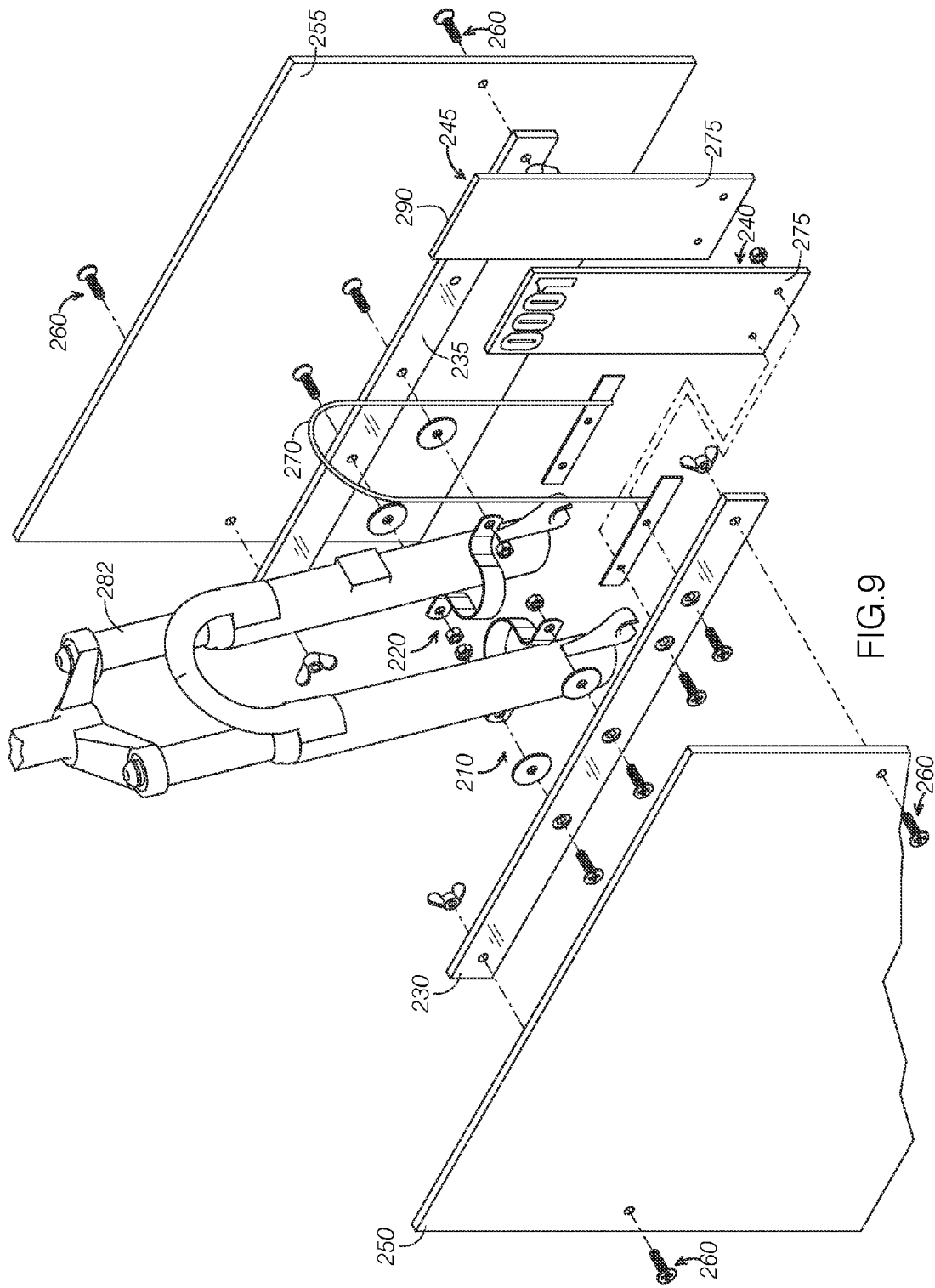
FIG. 9 is an exploded view of the mobile advertising display shown in FIG. 6.
Figure 10:
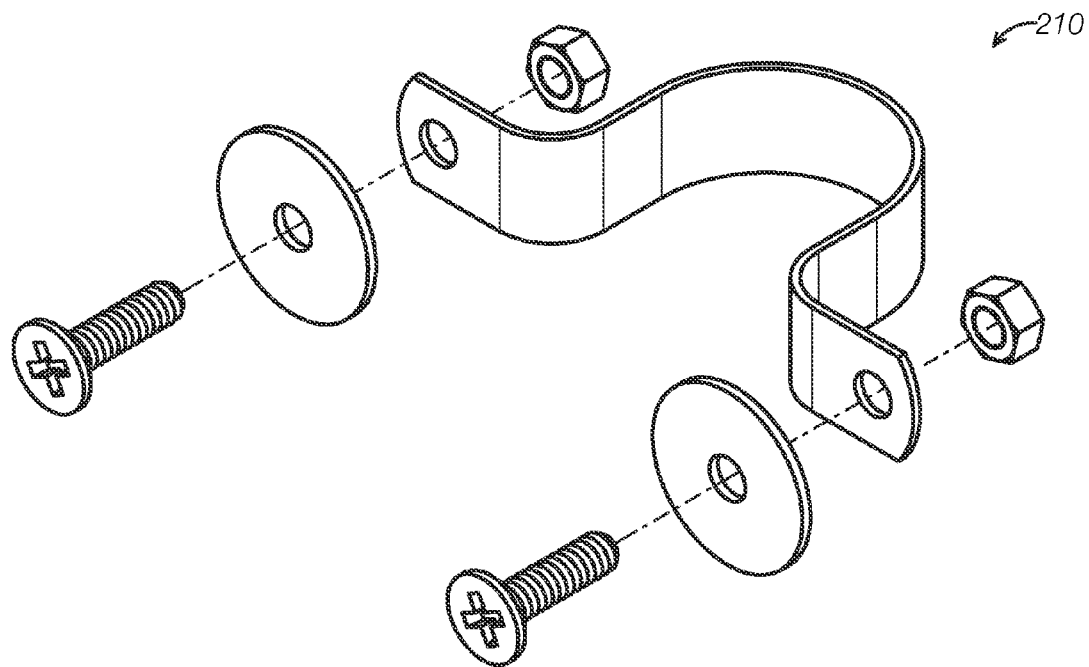
FIG. 10 is an exploded view of a second example of a mounting mechanism of the mobile advertising display shown in FIG. 6.
Figure 11:
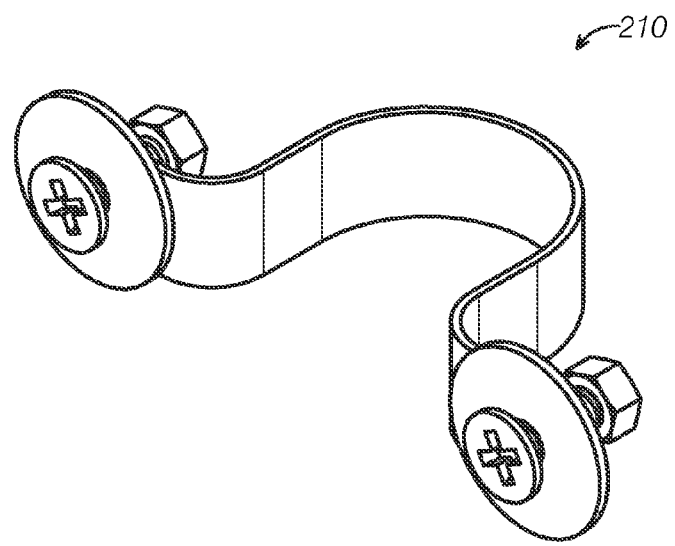
FIG. 11 is a close-up view of the second example of a mounting mechanism of the mobile advertising display shown in FIG. 6.

As depicted in FIGS. 9-11, mobile advertising display 200 includes examples of a different form of mounting mechanism, mounting mechanisms 210 and 220. FIGS. 10 and 11 depict mounting mechanism 210 in detail. Mounting mechanism 220 is identical in form and function to mounting mechanism 210.

In the example shown in FIG. 6, mounting mechanisms 210 and 220 are configured to mount directly proximate frame 282. Mounting mechanisms may further include protecting members disposed proximate the frame between mounting mechanisms and the frame as discussed above. Additionally or alternatively, mounting mechanisms may be configured to mount directly to or accommodate bike accessories, including, but not limited to, baskets, bag holders, and fender supports.

Figure 12:
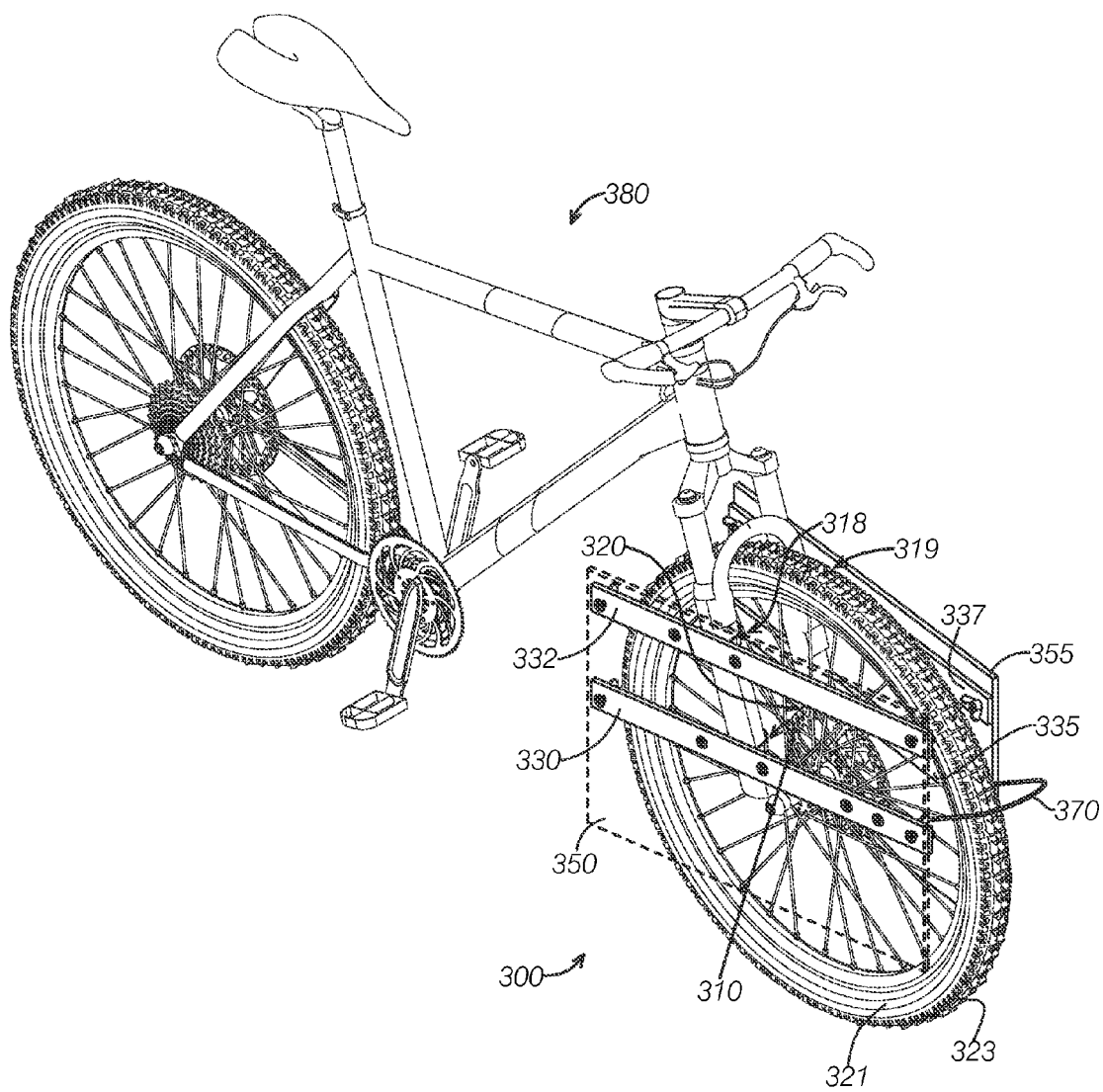
FIG. 12 is a side perspective view of a third example of a mobile advertising display configured to mount to a bicycle including bilaterally mounted advertising displays with four braces.
Figure 13:
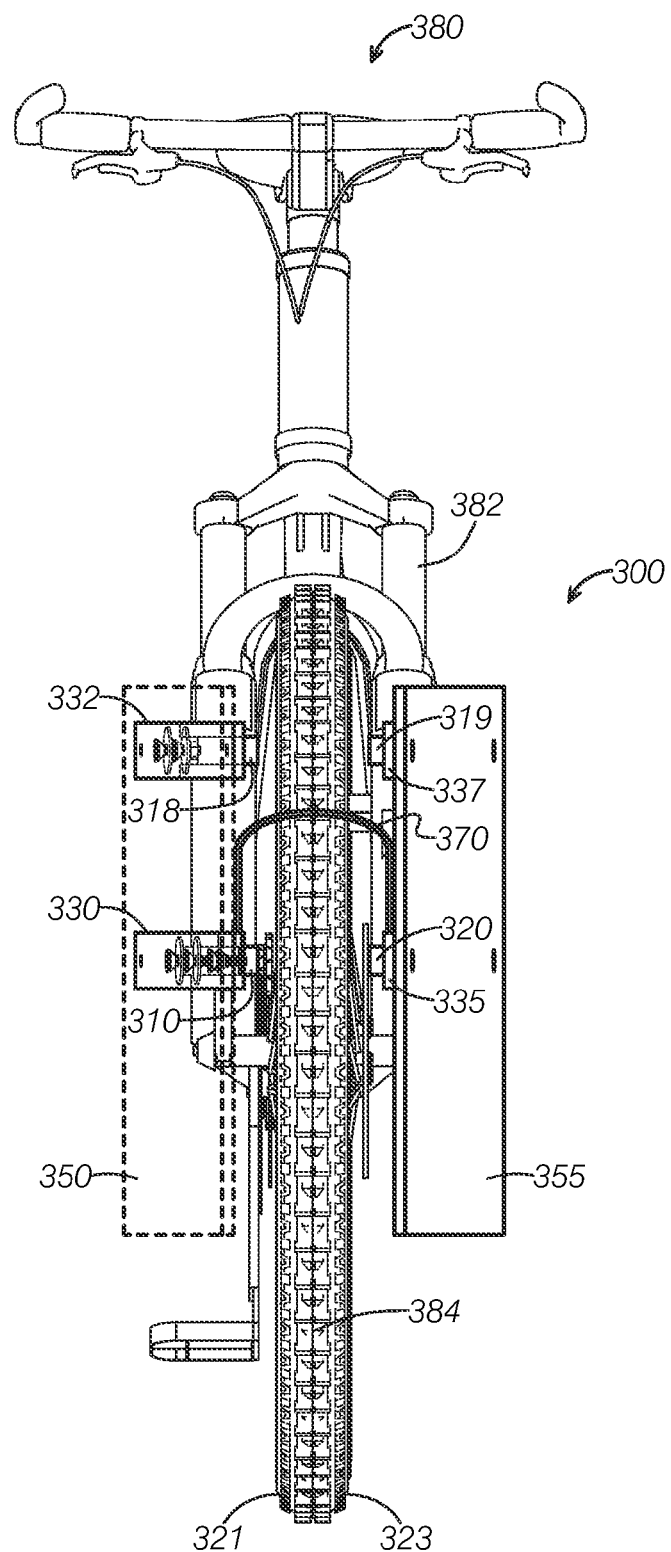
FIG. 13 is a front perspective view of the mobile advertising display depicted in FIG. 12, depicting the angle that the advertising displays are supported relative to the bicycle wheel and showing the position of the stabilizer.

Turning attention to FIGS. 12-13, a third example of a mobile advertising display, mobile advertising display 300, will now be described. Mobile advertising display 300 includes many similar or identical features to mobile advertising displays 100 and 200. Thus, for the sake of brevity, each feature of mobile advertising display 300 will not be redundantly explained. Rather, key distinctions between mobile advertising display 300 and mobile advertising displays 100 and 200 will be described in detail and the reader should reference the discussion above for features substantially similar between the three mobile advertising displays.

As depicted in FIG. 12, mobile advertising display 300 is configured to mount to a frame 382 of a bicycle 380 proximate a wheel 384. Mobile advertising display 300 includes a first mounting mechanism 310 configured to mount to frame 382 of bicycle 380 proximate a first side 321 of wheel 384, and a second mounting mechanism 320 configured to mount to frame 382 of bicycle 380 proximate a second side 323 of wheel 384 opposite first side 321.

Also depicted in FIG. 12, mobile advertising display 300 additionally includes a third mounting mechanism 318 vertically spaced from first mounting mechanism 310. Third mounting mechanism 318 is configured to mount to frame 382 of bicycle 380 proximate first side 321 of wheel 384.

Mobile advertising display 300 further includes a fourth mounting mechanism 319 vertically spaced from second mounting mechanism 320. Fourth mounting mechanism is configured to mount to the frame 382 of bicycle 380 proximate second side 323 of wheel 384 opposite first side 321.

Moreover, mobile advertising display 300 includes a first brace 330 selectively coupled to first mounting mechanism 310, and a third brace 332 selectively coupled to third mounting mechanism 318. A first display 350 is selectively retained on both first brace 330 and third brace 332.

Additionally, mobile advertising display 300 includes a second brace 335 selectively coupled to second mounting mechanism 330, and a fourth brace 337 selectively coupled to fourth mounting mechanism 319. A second display 355 is selectively retained on both second brace 335 and fourth brace 337.

As shown in FIG. 12, mobile advertising display 300 also includes stabilizer 370 selectively mounted to first brace 330 and second brace 335. Stabilizer 370 is configured to stabilize first brace 330 relative to second brace 335, and space first brace 330 and second brace 335 from wheel 384 to enable wheel 384 to travel freely between them. In one example, stabilizer 370 is comprised of 3/16-inch steel, is configured in a u-shape, and stabilizes first brace 330 relative to second brace 335.

Stabilizers may additionally or alternatively be selectively mounted to one or more braces to stabilize multiple braces relative to each other and the wheel. Stabilizers may also be comprised of any suitable material including, but not limited to, wood, plastic, metal, carbon fiber, composites, and combinations thereof. Moreover, stabilizers may also be configured in any shape or configuration that spaces and stabilizes the braces relative to each other and allows the wheel to travel freely between the braces, including, but not limited to, linear, curved, triangular, and angled.

As shown most clearly in FIG. 13, first brace 330, third brace 332, second brace 335, and fourth brace 337 are retained at an angle relative to wheel 384. In the example shown in FIG. 13 first display 350 and second display 355 are retained at an angle of 20 degrees by first brace 330, third brace 332, second brace 335, and fourth brace 337 relative to wheel 384. An angle of 20 degrees relative to wheel 384 has been found to be effective to increase or improve the aerodynamic profile of mobile advertising display 300. Further, an angle of 20 degrees facilitates or allows free movement of a rider's feet and legs as the bike's pedals travel.

Additionally or alternatively, any angle relative to the wheel which increases or improves the aerodynamic profile of the mobile advertising display may be used. Alternatively, an angle of zero relative to the wheel may also be used; the braces may be retained parallel to the center vertical axis of the wheel.

In the example shown in FIG. 12, first brace 330, third brace 332, second brace 335, and fourth brace 337 are comprised of polycarbonate material. Polycarbonate is particularly effective as a brace material because it is readily-deformable and resilient. Additionally or alternatively, braces may be comprised of any readily-deformable resilient material, including, but not limited to, wood, plastic, plexiglass, fiberglass, metal, carbon fiber, composites, and combinations thereof.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A mobile advertising display configured to mount to a bicycle having a frame and a wheel, comprising:
   a first mounting mechanism configured to mount to the frame of the bicycle proximate a first side of the wheel;
   a second mounting mechanism configured to mount to the frame of the bicycle proximate a second side of the wheel opposite the first side;
   a first brace selectively coupled to the first mounting mechanism;
   a first display selectively retained on the first brace;
   a second brace selectively coupled to the second mounting mechanism;
   a second display selectively retained on the second brace;
   a first identifier selectively mounted to the first brace;
   a second identifier selectively mounted to the second brace; and
   a stabilizer selectively mounted to the first identifier and the second identifier, the stabilizer configured to stabilize the first brace relative to the second brace and to space the first identifier and the second identifier from the wheel to enable the wheel to travel freely between them.

2. The mobile advertising display of claim 1, wherein the first identifier and the second identifier each include a backing plate to facilitate mounting the first identifier to the first brace and the second identifier to the second brace.

3. The mobile advertising display of claim 2, wherein the first identifier displays identifying information unique to the bicycle.

4. The mobile advertising display of claim 3, wherein the second identifier displays identifying information that is identical to the identifying information displayed by the first identifier.

5. The mobile advertising display of claim 1, wherein the first display and the second display are configured to display advertising media.

6. The mobile advertising display of claim 5, wherein the first display and the second display are configured to display identical advertising media.

7. The mobile advertising display of claim 1, wherein the first display is selectively retained on the first brace by retaining members.

8. The mobile advertising display of claim 1, wherein the wheel is oriented at the front of the bicycle.

9. The mobile advertising display of claim 1, wherein the first mounting mechanism further comprises:
   a retaining member configured to retain the first mounting mechanism proximate the frame of the bicycle; and
   a coupling member configured to selectively couple the first mounting mechanism to the first brace.

10. The mobile advertising display of claim 9, wherein the first mounting mechanism further comprises a protecting member disposed proximate the frame between the first mounting mechanism and the frame, the protecting member configured to restrict the retaining member from damaging the frame.

11. The mobile advertising display of claim 10, wherein the protecting member is complimentarily configured with the frame to receive the frame.

12. The mobile advertising display of claim 9, wherein the retaining member further comprises:
   a u-shaped bracket; and
   a planar tab coupled to the u-shaped bracket.

13. The mobile advertising display of claim 12, wherein the planar tab is configured to receive a threaded shaft coupling member to selectively couple the first mounting mechanism to the brace.

14. A mobile advertising display configured to mount to a bicycle having a frame and a wheel, comprising:
   a first mounting mechanism configured to mount to the frame of the bicycle proximate a first side of the wheel;
   a second mounting mechanism configured to mount to the frame of the bicycle proximate a second side of the wheel opposite the first side;
   a first brace selectively coupled to the first mounting mechanism;
   a first display selectively retained on the first brace;
   a second brace selectively coupled to the second mounting mechanism;
   a second display selectively retained on the second brace; and
   a stabilizer selectively mounted to the first brace and the second brace, the stabilizer configured to stabilize the first brace relative to the second brace and to space the first brace and the second brace from the wheel to enable the wheel to travel freely between them.

15. The mobile advertising display of claim 14, further comprising:
   a third mounting mechanism vertically spaced from the first mounting mechanism and configured to mount to the frame of the bicycle proximate the first side of the wheel;
   a fourth mounting mechanism vertically spaced from the second mounting mechanism and configured to mount to the frame of the bicycle proximate the second side of the wheel opposite the first side;
   a third brace selectively coupled to the third mounting mechanism;
   the first display selectively retained on the first brace and the third brace;
   a fourth brace selectively coupled to the fourth mounting mechanism; and
   the second display selectively retained on the second brace and the fourth brace.

16. The mobile advertising display of claim 15, wherein the first brace, third brace, second brace, and fourth brace are retained at an angle relative to the front wheel.

17. The mobile advertising display of claim 16, wherein the first brace, third brace, second brace, and fourth brace are retained at an angle configured to create an aerodynamic profile.

18. The mobile advertising display of claim 17, wherein the first brace, third brace and first display, and the second brace, fourth brace, and second display are comprised of readily-deformable resilient material.

19. The mobile advertising display of claim 14, wherein the first display and the second display are configured to display identical advertising media.

20. The mobile advertising display of claim 14, further comprising an identifier selectively mounted to the first brace, the identifier displaying identifying information unique to the bicycle.

* * * * *